Figure 1:
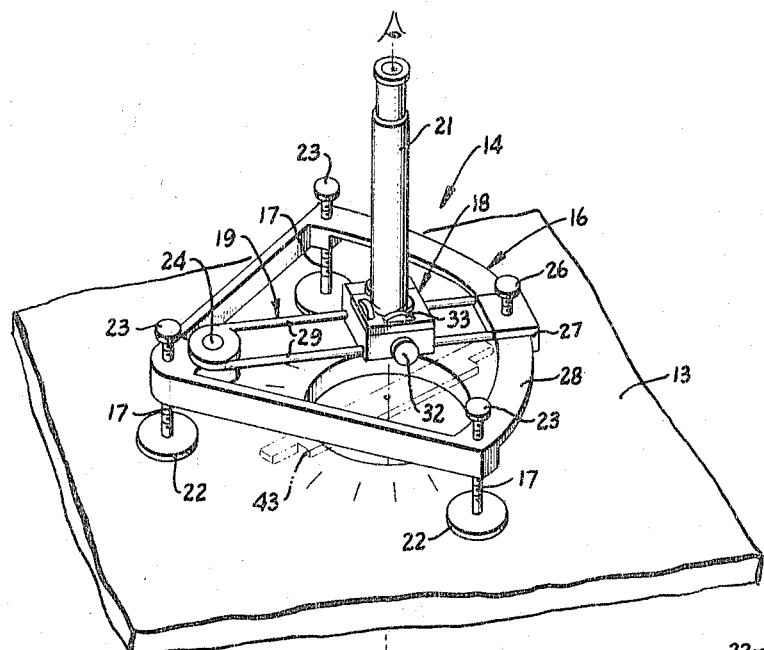

June 13, 1967  W. S. HODGES  3,324,557
OPTICAL PLUMBING DEVICE
Filed March 4, 1965  2 Sheets-Sheet 1

INVENTOR.
WILLIAM S. HODGES
BY
Schapp & Hatch
ATTORNEYS

June 13, 1967 W. S. HODGES 3,324,557
OPTICAL PLUMBING DEVICE
Filed March 4, 1965 2 Sheets-Sheet 2
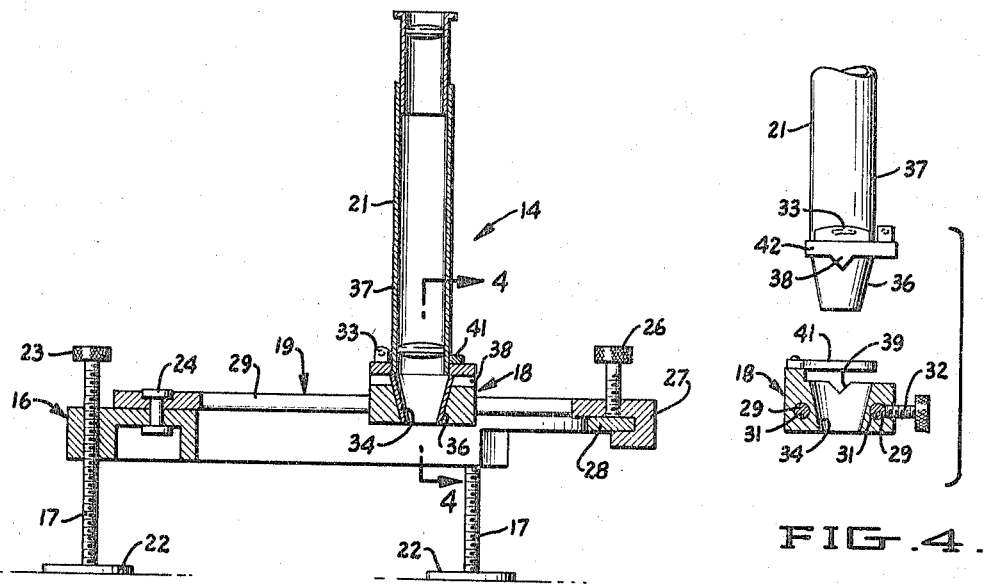
FIG. 3.
FIG. 4.
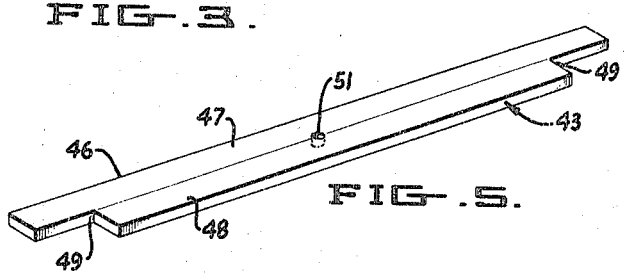
FIG. 5.
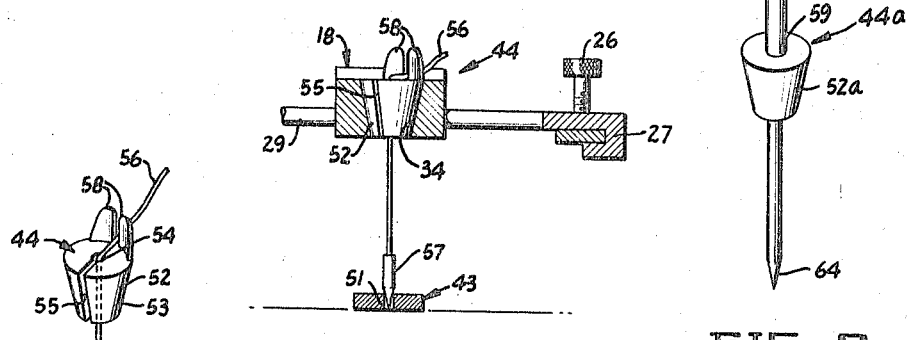
FIG. 7.
FIG. 8.
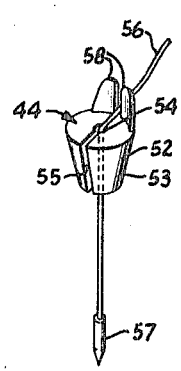
FIG. 6.
INVENTOR.
WILLIAM S. HODGES
BY Schepp & Hatch
ATTORNEYS

United States Patent Office 3,324,557
Patented June 13, 1967

3,324,557
OPTICAL PLUMBING DEVICE
William S. Hodges, 2053-65 Bayshore Blvd.,
Redwood City, Calif. 94063
Filed Mar. 4, 1965, Ser. No. 437,119
10 Claims. (Cl. 33—46)

The present invention relates to improvements in an optical plumbing device, and more particularly to a plumbing device capable of providing exact vertical alignment over relatively large distances through optical means.

It is well known that in certain applications, such as in the erection of buildings, that the common plumb has been used extensively in order to provide vertical alignment and enable the constructors to obtain the proper vertical ailignment for proper assembly of building members. The plumb is usually a pointed metal cone suspended on a string, which gives a vertical line from a higher point to a lower level. In many instances, this is satisfactory, and in these cases, the common plumb provides a simple, inexpensive solution to the problem. However, in certain situations, such a plumb is very difficult to use. This is particularly so where it is desired to reverse the usual procedure and locate a higher point from a fixed lower reference point, because the entire plumb must be moved continuously by trial and error until the plumb rests over the reference point.

This procedure is particularly difficult to carry out where the plumb contains a rather long line and the period of pendular movement is relatively long. It is also difficult where the plumb is utilized in exposed locations in tall buildings, steel structures for buildings, bridges, elevator shafts, and other situations where the plumb is exposed to winds. In such cases, the winds may even prevent the plumb from arriving at an accurate position.

In order to solve these difficulties and provide an improved system for obtaining vertical alignment from a lower level to an upper level, various optical systems have been worked out which include the projection of a light and other such systems. However, these systems have certain disadvantages and require extensive instrumentation and careful use under the best of conditions. The present invention provides an optical device which is suitable under various conditions of light and gives excellent accuracy which is comparable only to that obtained by a surveyor's transit.

Thus, it is a primary object of the present invention to provide an optical plumb capable of finding a reference point from a higher level which is in exact vertical alignment with a given reference point at a lower level.

Another object of the invention is the provision of an optical plumb of the character described which is simple in construction and absolutely reliable in operation.

Yet another object of the invention is to provide an optical plumb system of the character described which is suitable for use under adverse weather conditions and operates accurately under varying wind conditions.

A further object of the invention is to provide an optical plumbing device of the character described which is relatively simple in use and which provides extremely accurate results even when used by inexperienced operators.

Still another object of the invention is to provide an optical plumbing device of the character described which is capable of obtaining a vertical alignment above a fixed reference point in a rapid manner and which is capable of obtaining such vertical alignment at extremely remote locations from the given reference point.

Further objects and advantages of my invention will be apparent as the specification progresses, and the new and useful features of my optical plumbing device will be fully defined in the claims attached hereto.

In its broad aspect, the invention provides an optical plumbing device for locating a point in vertical alignment above a fixed reference point comprising a reference frame, means carried on the reference frame for leveling the device, a base mounting, means for supporting said base mounting on said reference frame in a manner permitting horizontal movement and adjustment thereof, and means on said base mounting for removably supporting a telescope in exact vertical alignment to said reference frame whereby the telescope may be accurately positioned in exact vertical alignment above said reference point by an operator. In addition, the invention provides means for translating this vertical alignment obtained by the telescope to a desired new reference position.

Figure 2:
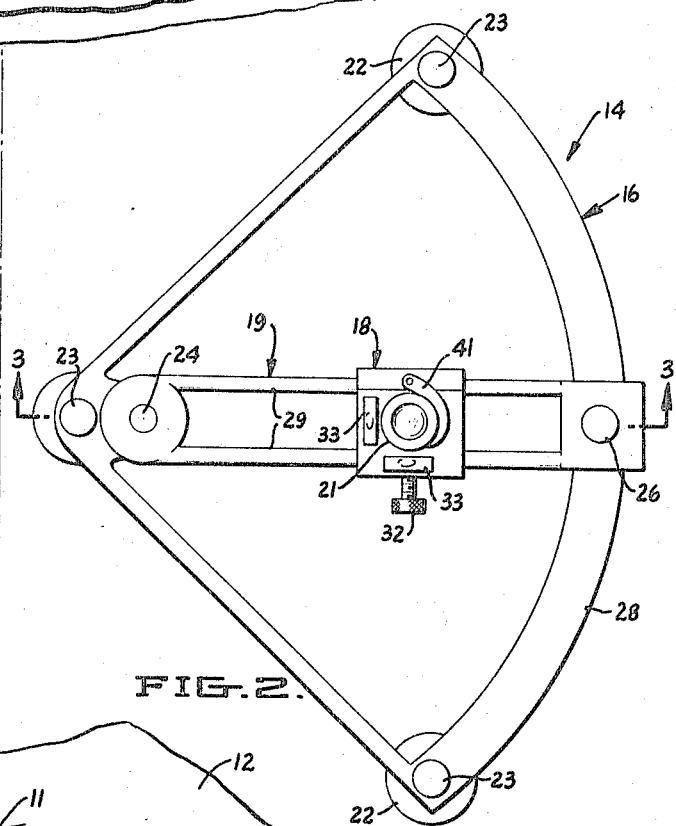

The preferred forms of the invention are shown in the accompanying drawings forming a part of this description, in which:

FIGURE 1 is a diagrammatic view illustrating the apparatus in use during the step of initial alignment and illustrating a major portion of the optical plumb unit of this invention in perspective;

FIGURE 2, an enlarged plan view of the apparatus shown in FIGURE 1;

FIGURE 3, a cross-sectional view of the apparatus shown in FIGURE 2, taken substantially in the plane of line 3—3 thereof;

FIGURE 4, a fragmentary exploded view of a portion of the apparatus illustrated in FIGURES 1 through 3 indicating the manner in which the telescope of the invention may be removably mounted and showing certain parts of the device as they appear substantially in the plane of line 4—4 of FIGURE 3;

FIGURE 5, a perspective view of a locating ruler which may be used in accordance with the invention to record the newly found point of vertical alignment;

FIGURE 6, a perspective view of a special plumb which may be utilized with the device shown in FIGURES 1 through 3 after alignment has been obtained to position the ruler of FIGURE 5;

FIGURE 7, a cross-sectional view of the special plumb illustrated in FIGURE 6 and associated parts of the device; and FIGURE 8, an alternate form of locating device which may be used instead of the special plumb illustrated in FIGURES 6 and 7.

While only the preferred forms of the invention are shown, it should be understood that various changes or modifications may be made within the scope of the claims attached hereto without departing from the spirit of the invention.

Referring more particularly to the drawings, there is shown in FIGURE 1 a fixed reference point 11 on a floor 12 of a lower level of a building or the like which is to be aligned with a point on a higher floor 13 to provide exact measurements so that the building structures may be assembled in proper vertical alignment in accordance with well-known construction procedures. The optical plumbing device of this invention comprises a number of parts adapted for step-wise operation, and a major portion of the plumbing device is shown in FIGURE 1, in which the device contains those parts required for achieving alignment.

Thus, there is shown in FIGURES 1 through 3 an aligning unit 14 which contains a reference frame 16 equipped with adjustable legs 17 for leveling the reference frame, a base mounting 18, support means 19 for supporting the base mounting on the reference frame in a manner permitting horizontal movement and adjustment, and a telescope 21 removably carried in said base mounting in exact perpendicular alignment therewith.

The reference frame 16 may be any suitable frame open at the interior to permit adjustment of the telescope and having adjustable legs or equivalent means for providing a sturdy support in a level manner. Preferably, the frame is generally triangular in shape, having three legs 17 located at the vertices thereof. As here shown, these legs are threadably engaged through suitable threaded openings through the frame and each adjustable leg has a foot 22 for providing excellent support and a knurled handle 23 for facilitating manual adjustment of the effective length of the legs.

The support means 19 should be capable of providing positioning of the base mounting 18 and telescope 19 carried thereon in any position within a given area. Accordingly, this mounting could be provided to move transversely in two directions in accordance with the usual rectilinear coordinate system, if desired. However, I prefer to utilize a polar coordinate system in which the support means 19 is pivotally mounted and serves as a radius capable of swinging through an arc and the base mounting 18 is carried thereon at an adjustable position from the pivot, so that any desirable point within the area may be obtained by coordinated movement of the radial arm and translation therealong. Thus, as here shown, the support means 19 is pivoted on the frame at 24 through any suitable accurate pivoting means. This support means or radial arm is equipped with a set screw 26 at the extremity thereof, which is operative in combination with an integral bracket 27 built onto the extremity of the arm and an arcuate side member 28 of reference frame 16. In this way, only one set screw need be set for rigidly securing the angular position of the arm.

The support means 19 or radial arm is preferably built as a pair of accurately aligned parallel members 29 serving as rails or guides on which base mounting 18 may slide. As here shown, base mounting 18 is generally block-shaped and has a pair of parallel holes 31 bored therethrough which are spaced apart and sized to receive the parallel members 29 (see FIGURE 4). With this construction, the base mounting 18 may be slid along the arm or support means 19 to provide any desired length of radius from pivot point 24. When the desired length of arm or radius is obtained, set screw 32 mbay be tightened to hold the position.

The telescope 21 is equipped with a pair of perpendicularly disposed spirit levels 33 for providing exact horizontal adjustment of the device. It will be appreciated that these levels could be placed on other parts of the device and that the exact location thereof is not critical. However, I prefer to place them on the telescope 21 to provide accurate perpendicular alignment between the telescope and the horizontal position obtained by adjustment of these levels.

It is an important feature of this invention that the telescope 21 be removably mounted and yet obtain an accurate vertical positioning. It is also important that this removable mounting be of the nature that the base mounting 18 therefor will not be disturbed in the precise positioning thereof during this removal. In order to obtain such a mounting, I have provided a frustoconical socket 34 which is sized to match a frustoconical exterior surface 36 on the lower portion of the housing 37 of telescope 21.

As here shown, the socket is also equipped with an alignment wedge 38 carried on the telescope and an alignment notch 39 carried on the base mounting. The wedge and notch act in cooperation with a pivoted sickle-shaped holding arm 41 which is adapted to fit over a shoulder portion 42 on the lower portion of the housing of the telescope. In this way, the holding arm secures the telescope against axial movement, while the wedge and notch secures it against rotational movement. This secures the telescope firmly in place for the obtaining of accurate measurements, and prevents the inadvertent dislodgement of the telescope on the job, which dislodgement might cause injury thereto.

The telescope itself is otherwise formed in the manner of a conventional sighting telescope and contains appropriate lenses and cross-hairs so that a point at a distance may be focused into view and accurately lined up with the cross-hairs.

The overall optical plumbing device comprises not only the alinging unit 14, but various accessory pieces of equipment which are found to be useful, such as the loacting ruler 43 illustrated in FIGURE 5 and either or both of the position indicating means shown in FIGURES 6 through 8.

The locating ruler 43 is simply an accurately made bar member 46 constructed from a long bar 47 and a short bar 48 so as to provide internal corners 49 at each end thereof for indicating positions. The ruler also contains a small opening 51 for indicating a reference point, either to be located or already located.

The special plumb shown in FIGURES 6 and 7 is utilized to translate the vertical alignment obtained by the telescope and fixed on base mounting 18 to another point at a higher level. In other words, this plumb serves as a position indicating means. As here shown, the plumb consists of a plug member 52 having a frustoconical surface 53 similar to the surface 36 of the telescope 21 and adapted to fit within the socket 34 of base member 18. This plug has a vertical hole 54 drilled therethrough, with the bottom thereof exactly centered within the plug so as to carry a string 56 and a plumb bob 57 in vertical alignment with the position obtained by the telescope. As here shown, the plug member 52 also contains a slot 55 for easy placement of the string and guides 58 to hold the string in proper position.

In operation, the plumb bob is used to bing a point up from a lower floor, such as lower floor 12, to upper floor 13 and the first step is to set up the aligning unit 14 as shown in FIGURE 1. This involves placing the instrument in the vicinity of the exact point and finding suitable supports for the three legs thereof. This general positioning may be achieved simply by a look down from the higher level toward the point or mark 11 below to obtain an estimate. The telescope 21 is seated in the base mounting 18 and secured therein by holding arm 41. This arrangement assures a tight seat of the telescope and easy handling, without need for screwing or other such operations which could upset the accurate adjustment to be obtained.

The telescope is next set in an exact vertical position by adjustment of the adjustable legs 17 through their knurled handles 23 and until the levels 33 indicate a horizontal positioning of base mounting 18. The telescope is then focused and ready for sighting against fixed reference point 11. The support means or arm 19 is made pivotal by assuring that set screw 26 is loose and the slidable nature of base mounting 18 on the support means 19 is also assured by loosening of set screw 32. Next, the arm 19 is rotated and the base mounting 18 is adjustably slid along the guides until the telescope shows that it is exactly above the fixed reference point 11. This is positively assured by focusing the telescope and bringing the reference point 11 into the exact position indicated by the cross-hairs in the telescope.

With this position achieved, set screws 26 and 32 are carefully tightened to secure this fixed position. If desired, a recheck may be made by sighting through the telescope after this tightening has been achieved. With the aligning unit thus carefully fixed in alignment, the holding arm 41 is carefully pivoted out of position and the telescope carefully lifted out of its socket. This may be achieved without disturbing the fine, accurate adjustment of the aligning unit.

The positioning indicating means 44 is then carefully inserted into socket 34 and the locating ruler 43 is inserted in place, as shown in phantom in FIGURE 1. This arrangement provides the set-up accurately shown in the fragmentary sectional view of FIGURE 7. The ruler is then moved around and operated in conjunction with the plumb bob 57 until the bob 57 indicates accurate positioning of the ruler by placing the opening 51 of the ruler in exact alignment under the point of the plumb bob. The ruler is then used to place markings on the floor or some such fixed reference location at corners 49. With one position of the ruler thus located, the ruler is rotated somewhat and similarly positioned again. With the new reference point thus accurately marked, the plumbing device may be taken up and put away or used in another location. Any time the new reference point is desired to be located, the ruler can be reset in the two positions and the point marked out carefully.

From the foregoing description, it is seen that I have provided a relatively simple device operating on optical principles which are of proven accuracy because they utilize known optical devices in a manner similar to surveyors' instruments so that a relatively simple and accurate device may be utilized to obtain vertical alignment and solve a serious problem in the construction industry in a relatively simple and inexpensive manner.

It will be appreciated that various forms and modifications of the invention may be employed, and this is particularly true of the locating means 44. By way of illustration, a locating means 44a is shown in FIGURE 8, in which the plug 52a contains an enlarged bore 59 in accurate vertical central alignment thereto and a tube 61 fitting in this bore and serving as a guide for a spike 62 which is telescoped therethrough in close telescoping relation. The spike 62 contains a head 63 so as to prevent the spike from dropping clear through the position indicating means 44a.

In operation, when the position indicating means 44a is to be used instead of the position indicating means 44, the unit is simply placed in socket 34 and the spike lifted to a position high enough to allow the locating ruler 43 to be placed thereunder. The point 64 of the spike is then allowed to drop into the hole 51 of the locating ruler so as to hold the ruler in position while marking is effected. In this way, it is seen that where the locating ruler is to be marked relatively close to the base mounting 18, this embodiment is particularly valuable.

Where the locating ruler is to be placed at some distance, say, several feet, from base member 18, then the position indicating means 44 shown in FIGURE 6 is more satisfactory. In other situations, where the ruler is to be aligned at some distance even further from the mounting plate 18, it is believed that it might be within accurate focusing distance of the telescope and that the telescope itself may be used to position the ruler. The procedure is the same as that which is used where the optical plumb of this invention is used for going from a fixed reference point above to one below, and this procedure will be described next.

Where a fixed reference point from a vertical position above is located, such as by the procedure already given, the optical plumbing device is set up over the position in accurate alignment thereto and the telescope is fit into the socket and aligned vertically by leveling, as indicated above. The operator then sights through the telescope and has a second person below move the guide ruler or the like according to instructions until accurate placement is obtained. Marking is then effected.

Thus, it is seen that the optical plumb of this invention is not only particularly valuable to solve the particular problem to which it is directed, but it is also capable of many other useful functions.

I claim:

1. An optical plumbing device for locating a point in vertical alignment above a fixed reference point, comprising a reference frame, means for leveling said reference frame, a base mounting, means for supporting said base mounting on said reference frame in a manner permitting multidirectional horizontal movement and adjustment thereof to provide an adjustment at any point within a given area, a telescope, socket means on said base mounting and said telescope for removably supporting the telescope in exact vertical alignment to said reference frame whereby said base mounting and telescope may be adjusted to a position in which the telescope indicates exact alignment to a fixed reference point located at a distance below, and removable plumbing means having a socket element supportable in the socket means in said base mounting when the telescope is removed for indicating a position near said reference frame and in vertical alignment with the position corresponding to that located by the telescope when the telescope is supported in the socket.

2. An optical plumbing device for locating a point in vertical alignment above a fixed reference point, comprising a reference frame, means for leveling said reference frame, a base mounting, means for supporting said base mounting on said reference frame in a manner permitting multidirectional horizontal movement and adjustment thereof, to provide an adjustment at any point within a given area, a telescope, socket means for securing said base mounting in adjusted position, means on said base mounting and said telescope for removably supporting the telescope in exact vertical alignment to said reference frame whereby said base mounting and telescope may be adjusted to a position in which the telescope indicates exact alignment to a fixed reference point located at a distance below, and removable plumbing means having a socket element supportable in the socket means in said base mounting when the telescope is removed for indicating a position near said reference frame and in vertical alignment with the position corresponding to that located by the telescope when the telescope is supported in the socket.

3. An optical plumbing device for locating a point in vertical alignment above a fixed reference point, comprising a reference frame, means for leveling said reference frame, a base mounting, a socket formed in said base mounting, said socket having walls defining an inverted frustum of a cone, a telescope having a housing containing walls defining a frustoconical configuration adapted to fit into the socket formed in said base mounting, means for supporting said base mounting on said reference frame in a manner permitting horizontal movement and adjustment thereof, and removable plumbing means containing walls defining a frustoconical configuration supportable in said base mounting when the telescope is removed for indicating a position near said reference frame and in vertical alignment with the position corresponding to that located by the telescope when the telescope is supported in the socket.

4. The optical plumbing device defined in claim 3, in which means is provided for securing the telescope in the socket by blocking both rotational and axial movement thereof.

5. An optical plumbing device for locating a point in vertical alignment above a fixed reference point, comprising a reference frame, means for leveling said reference frame, a base mounting, a socket formed in said base mounting, said socket having walls defining an inverted frustum of a cone, a telescope having a housing containing walls defining a frustoconical configuration adapted to fit into the socket formed in said base mounting, means for supporting said base mounting on said reference frame in a manner permitting horizontal movement and adjustment thereof, and removable plumbing means containing a plug supportable in said socket for suspending a plumb bob and indicating a position near said reference frame whereby a new position is obtained which is in vertical alignment with said fixed reference point.

6. An optical plumbing device for locating a point in vertical alignment above a fixed reference point, comprising a reference frame, means for leveling said reference frame, a base mounting, a socket formed in said base mounting, said socket having walls defining an inverted frustum of a cone, a telescope having a housing containing walls defining a frustoconical configuration adapted to fit into the socket formed in said base mounting, means for supporting said base mounting on said reference frame in a manner permitting horizontal movement and adjustment thereof, a plug having walls adapted to fit into the socket in said base mounting, and a spike fitting through said plug in central alignment therein and having a point capable of vertical adjustment below said plug for indicating a position near said reference frame and in vertical alignment with said fixed reference point.

7. An optical plumbing device for locating a point in vertical alignment above a fixed reference point, comprising a reference frame containing three leg members at triangularly spaced locations, said leg members being threadably carried on seaid reference frame and having their effective length adjustable on rotation of said leg members with respect to said frame, support means in the form of an arm rotatably mounted on said reference frame for swinging movement in a plane parallel to said reference frame, a bracket carried on said arm at a position remote from said rotatable mounting, an arcuate shaped member within said frame adapted to coincide with said bracket during swinging movement of said arm, fastening means carried on said arm and cooperable with said bracket and said member for securing a rotational loction of said arm, a base mounting slidably held on said arm, means for fixing the position of said base mounting on said arm, spirit level means carried on said device for providing horizontal orientation of said base mounting upon adjustment of the effective length of said legs, a socket formed in said base mounting, said socket having walls defining an inverted frustum of a cone, a telescope having a housing containing walls defining a frustoconical configuration adapted to fit into the socket formed in said base member, and removable plumbing means supportable in said base mounting for indicating a position near said reference frame and in vertical alignment with sad base mounting.

8. The optical plumbing device defined in claim 7 in which the telescope is secured in the socket by means of conforming wedge and notch elements in confronting walls of the socket and matching walls of the telescope, and a rotatable holding arm movable over a portion of the housing of the telescope to secure the telescope against axial movement.

9. An optical plumbing device for locating a point in vertical alignment above a fixed reference point, comprising a reference frame containing three leg members at triangularly spaced locations, said leg members being threadably carried on said reference frame and having their effective length adjustable on rotation of said leg members with respect to said frame, support means in the form of an arm rotatably mounted on said reference frame for swinging movement in a plane parallel to said reference frame, a bracket carried on said arm at a position remote from said rotatable mounting, an arcute shaped member within said frame adapted to coincide with said bracket during swinging movement of said arm, fastening means carried on said arm and cooperable with said bracket and said member for securing a rotational location of said arm, a base mounting slidably held on said arm, means for fixing the position of said base mounting on said arm, spirit level means carried on said device for providing horizontal orientation of said base mounting upon adjustment of the effective length of said legs, a socket formed in said base mounting, said socket having walls defining an inverted frustum of a cone, a telescope having a housing containing walls defining a frustoconical configuration adapted to fit into the socket formed in said base member, and removable plumbing means containing a plug supportable in said socket for suspending a plumb bob and indicating a position near said reference frame whereby a new position is obtained which is in vertical alignment with said fixed reference point.

10. An optical plumbing device for locating a point in vertical alignment above a fixed reference point, comprising a reference frame containing three leg members at triangularly spaced locations, said leg members being threadably carried on said reference frame and having their effective length adjustable on rotation of said leg member with respect to said frame, support means in the form of an arm rotatably mounted on said reference frame for swinging movement in a plane parallel to said reference frame, a bracket carried on said arm at a position remote from said rotatable mounting, an arcuate shaped member within said frame adapted to coincide with said bracket during swinging movement of said arm, fastening means carried on said arm and cooperable with said bracket and said member for securing a rotational location of said arm, a base mounting slidbly held on said arm, means for fixing the position of said base mounting on said arm, spirit level means carried on said device for providing horizontal orientation of said base mounting upon adjustment of the effective length of said legs, a socket formed in said base mounting, said socket having walls defining an inverted frustum of a cone, a telescope having a housing containing walls defining a frustoconical configuration adapted to fit into the socket formed in said base member, a plug having walls adapted to fit into the socket in said base member, and an extensible member fitting through said plug in central alignment therein and having a point capable of vertical adjustment below said plug for indicating a position near said reference frame and in vertical alignment with said fixed reference point.

References Cited

UNITED STATES PATENTS

| | | | |
|---|---|---|---|
| 906,180 | 12/1908 | Wrightsman | 33—191 |
| 946,602 | 1/1910 | Heitzler | 33—68 |
| 1,233,458 | 7/1917 | Fisk | 33—191 |
| 2,599,652 | 6/1952 | Mitchell | 33—189 |
| 3,044,173 | 7/1962 | O'Neal et al. | 33—46 |

ROBERT B. HULL, *Primary Examiner.*

LEONARD FORMAN, *Examiner.*

W. K. QUARLES, *Assistant Examiner.*